United States Patent [19]

Wick

[11] 4,055,891
[45] Nov. 1, 1977

[54] RATCHET-OPERATED CABLE CUTTER

[76] Inventor: John R. Wick, 1040 Old Welsh Road, Huntingdon Valley, Pa. 19006

[21] Appl. No.: 689,196

[22] Filed: May 24, 1976

[51] Int. Cl.² .............................................. B26B 13/26
[52] U.S. Cl. ......................................... 30/250; 30/92
[58] Field of Search ................. 30/249, 250, 252, 191, 30/192, 92, 93; 81/314, 391, 392, 393

[56] References Cited

U.S. PATENT DOCUMENTS

| | | | |
|---|---|---|---|
| 3,210,844 | 10/1965 | Tontscheff | 30/250 |
| 3,885,309 | 5/1975 | Lund | 30/250 |
| 3,922,783 | 12/1975 | Hayes | 30/250 |

Primary Examiner—Jimmy C. Peters
Attorney, Agent, or Firm—Synnestvedt & Lechner

[57] ABSTRACT

Handle-operated shear-type cable cutter with one jaw member integral with one of its handles, the other jaw member being connected with the first by a main pivot about which said other jaw member rotates. An arcuate ratchet segment, integral with the rotatable jaw member, has ratchet teeth on a portion of its periphery remote from the cutting edge of the jaw. It is driven by a pawl assembly comprising a U-shaped bracket, the saddle of which houses a drive pawl and the legs of which carry, at their free ends, journals which support the main pivot pin and transmit thrust to the jaw members. A link member, pivoted at both ends, interconnects the operating handle with the pawl assembly. The cutting edges of the jaws are shaped to define an opening within the tips as the jaws meet, which is preferably diamond-shaped, but which reduces in size as the jaws close. A lost-motion pin-in-slot connection limits closing movement of the handles.

9 Claims, 5 Drawing Figures

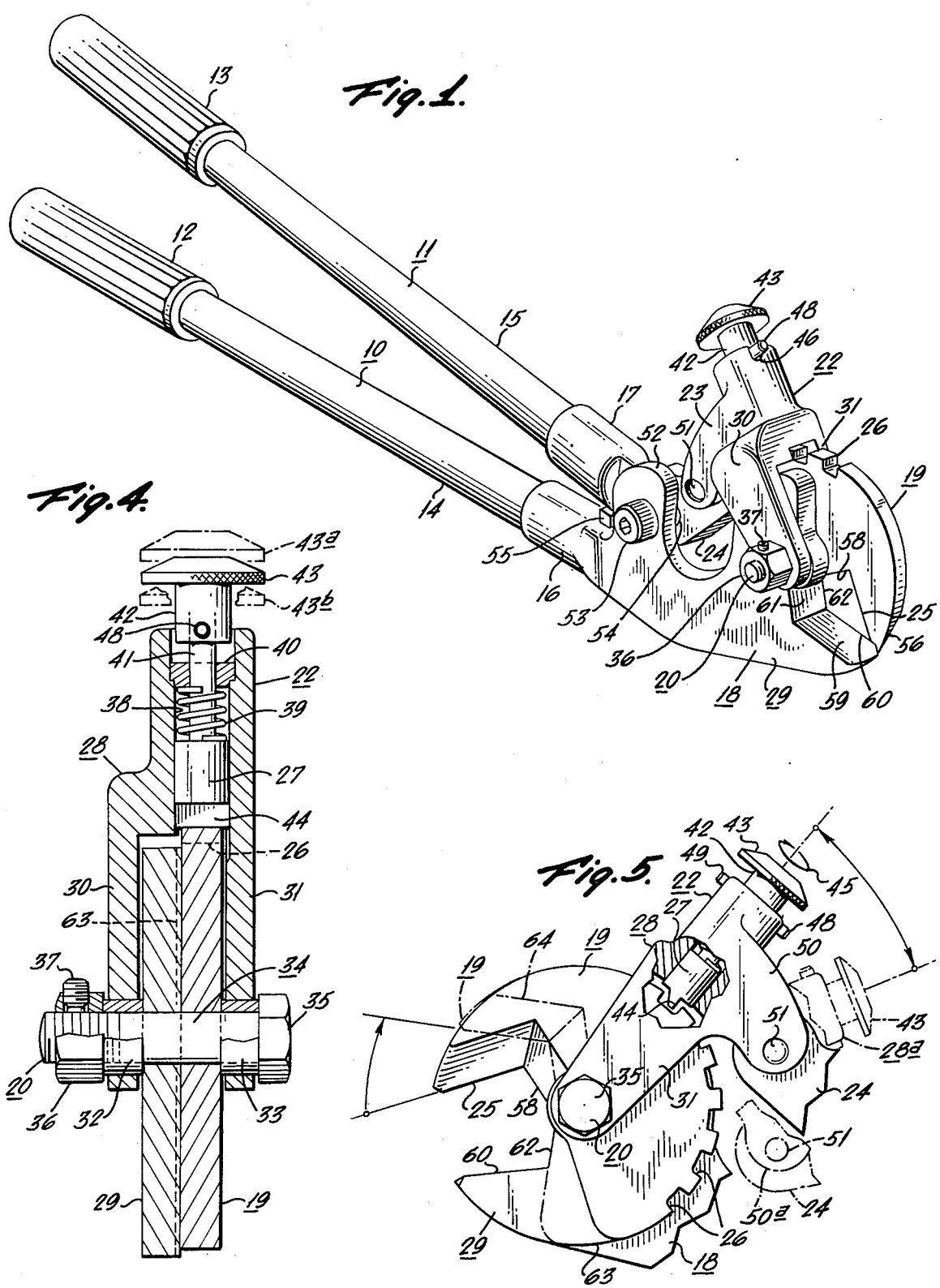

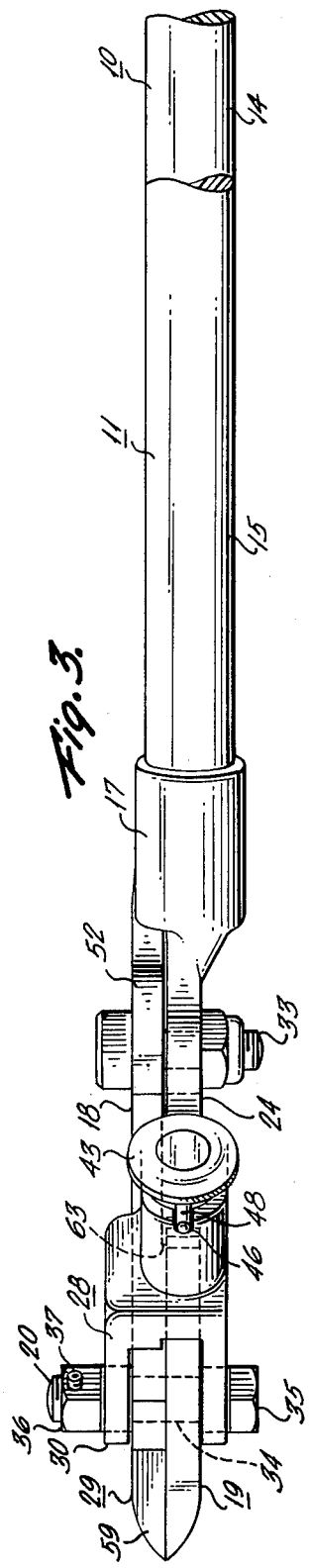
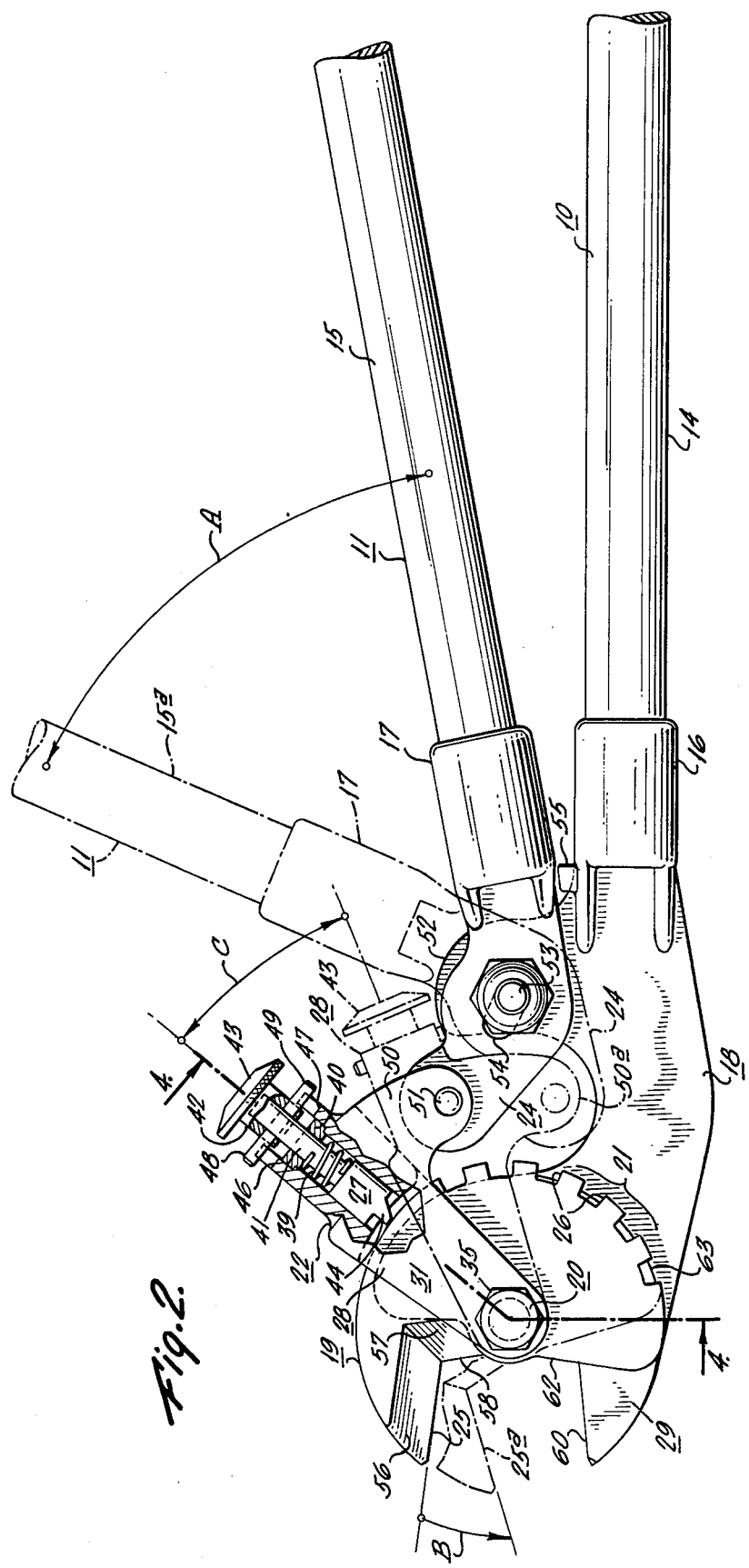

RATCHET-OPERATED CABLE CUTTER

This invention relates to two-handled cutters for severing cable, tubing, and the like. It is particulary concerned with the provision of dual handled tools of the shear cutting type, in which the leverage needed is preserved or enhanced while still permitting operation is close quarters, by interposing a ratchet drive for one of the cutting jaws, and using a compound lever system for operating the driving pawl. Cutting tools embodying the invention utilize a novel pawl-mounting assembly, which permits the application of a high degree of cutting force, yet resists the twisting moment of the tool as a whole and the tendency of the jaws to spread apart, which effects are due to the parallel surfaces of the bevels rising from the cutting edges of the jaws. The lever system in the pawl driving portion incorporates a lost-motion or sliding pivot-in-a-slot arrangement to permit compound lever operation and also to check sudden unintended excess movement of the handles towards each other. And the jaws themselves, in the preferred embodiment, have oppositely-angled straight cutting edges so configured as, in effect, to draw the cable or conduit into the cutting region between the jaws, thus minimizing the extent to which the jaws must open in order to accommodate the cable, without imparting any significant thrust in a radially-outward direction from the pivot.

Center-cutting and smooth-cutting tools of the hand-operated type are well known at this time. Generally such tools have jaws with rectilinear cutting edges which extend radially outward from the virtual fulcrum point. Such tools have the advantage that they can be used to cut cable even when it is closely held to a wall or panel. They have the disadvantage that they tend, in use, to urge the tool radially away from the cable it is intended to cut, and, because their cutting edges are of straight-line formation, they squeeze and distort the round cable or tube in cutting it.

The difficulties with the type of tool just described have led to the use of shear cutters having hook-shaped jaws, as well exemplified in U.S. Pat. No. 2,794,250. In that patent, the jaws have cutting edges which define a curtate cycloid form. This reduces distortion and increases cutting efficiency, but has the serious disadvantage that the handles must be spread wide apart — almost 180° in some cases — in order to attain full opening between the tips of the jaws to receive the cable to be cut. This prevents the use of the tool in reaching into corners, and limits its usefulness even on panels or flat walls, unless the space right and left of the cable is unobstructed, which is often not the case.

The present invention is specifically applicable to hand-operated tools for cutting cable, tubing, rods, and the like, in which cutting force is amplified and the extent of movement of the handles is reduced through the use of a ratchet and pawl drive for one of the tool jaws, and a compound lever system is employed for multiplying the force applied by the handles.

The invention attains one of its primary objectives by providing means for counteracting the tendency of the jaws to spread laterally apart at the initiation of a cut. The bevels rising from the opposed cutting edges tend to spread the jaws apart, since their surfaces lie in parallel planes, so that the jaws tend to slide over the work piece instead of cutting it. The invention minimizes the tendency of the tool to twist about its lengthwise axis under such conditions.

Another objective is to provide a tool of the type referred to in which a protective intermediate stop is provided to arrest closing movement of the handles at a point just short of the conventional positive stop, which latter is used as a final check on inward movement of the handles. This intermediate stop prevents the hands of the operator from hitting each other if, as sometimes happens, the material being severed suddenly yields, with consequent abrupt movement of the handles towards each other.

How these, and other objectives which will become apparent to those skilled in the art, are to be attained will become apparent from a consideration of the following description and the accompanying drawings, which illustrate a preferred embodiment of the present invention.

In the drawings:

FIG. 1 is a perspective view of a cable cutter embodying the invention;

FIG. 2 is an elevational view, partly in section, from one side of the device of FIG. 1;

FIG. 3 is a plan view of the device;

FIG. 4 is a sectional detail, through the pawl-mounting assembly, taken along the line 4—4 of FIG. 2;

FIG. 5 is an elevational view, partly in section, of a portion of the device, taken from the side opposite to that shown in FIG. 1.

Turning now to FIG. 1: The cable cutter as a whole comprises a pair of handles 10,11, preferably having hand grips 12,13, of insulating material, such as rubber, which are carried at the outer ends of two rods or tubes 14,15. Preferably, to prevent electrical shock, these are made of solid, nonconductive material, such as fiber-reenforced plastic or nylon extrusions. The rods are mounted in sockets 16,17, each of which is an integral part of the cutter proper.

The fixed jaw member 18 is an integral extension of the socket 16. The opposite jaw member 19 is mounted for rotation with reference to the jaw 18, by means of a transverse main pivot 20. The jaw member 19 is provided with a rack or ratchet wheel segment 21 which is actuated by means of a pawl assembly 22, to cause the movable jaw to rotate on the common pivot. The pawl assembly is connected by a pivoted lever 23 to the drive lever 24, which is itself connected to the driving handle 11 by way of the socket 17.

FIG. 2 shows the device from the side opposite to that facing the viewer in FIG. 1. In this view the general configuration of the rotating jaw member 19 is more clearly shown. Its cutting edge 25 is bevel ground from the thickness of the member 19, which is provided, in a portion removed from the cutting edge, with the ratchet segment 21 previously mentioned. This ratchet segment has teeth 26 so configured as to be engaged by the pawl 27, and to be driven thereby in either of two directions, to open or close the jaws.

The pawl 27 is mounted in the pawl assembly 22, seen in FIG. 1. This assembly is shown in enlarged form in FIG. 4, and as viewed from the "operating" side in FIG. 2. From these views it will be seen that a generally U-shaped saddle element 28 straddles the rotatable jaw element 19 and the cutting part 29 of the fixed jaw 18.

The saddle 28 has two depending legs 30,31 which are arbored to receive two sleeve bearings 32,33 in which the pintle 34 of the primary pivot 20 is mounted. The pintle 34 has a headed end 35 and an adjustable cap screw 36. The sleeve bearings run loose in their arbors. They are of substantial outside diameter and their axial dimension is greater than the thickness of the legs. Their inner ends bears on the outer faces of the jaws 19 and 29, and their outer ends abut the headed end 35 and the cap screw 36. Thus, tension imposed on the pintle is transmitted through the sleeve bearings to the jaws, without imposing significant distortional stress on the legs of the U-shaped saddle.

The tension imposed on the pintle is of significant importance, since the cutter will bind if the tension is excessive, and the planar surfaces of the jaws will tend to spread instead of cutting, if the tension is not great enough. For this reason the cap nut is preferably applied by the use of a torque wrench, and when the precisely accurate setting is attained, it is maintained by tightening a set screw 37.

The saddle portion 28 of the pawl assembly is bored to provide a chamber 38 to guide the pawl 27 and to house a compression spring 39 to urge the pawl into contact with a tooth cavity of the ratchet segment. The spring 39 is retained in the chamber 38 by means of a seating washer 40 which is held in the outer portion of the bore by a press fit. The pawl has a stem 41 which extends radially outwardly. It passes through the spring 39 and through an arbor in the press-fitted washer 40. The stem 41 terminates in a boss 42. This has a knurled cap 43 on its outer end, for lifting and rotating the pawl in order to reverse its direction of thrust.

The pawl 27 has an inner detent portion 44 which is configured to engage the teeth 26 in the ratchet segment 21. FIG. 5 illustrates the ratchet and pawl one notch short of the end of the opening movement of the jaw. The dot-and-dash line 64 in FIG. 5. indicates the fully-open position of the movable jaw 19. When the jaws have been opened sufficiently to engage the cable to be severed, the pawl is manually lifted by means of the cap 43 and is rotated through an angle of 180°, as suggested by the directional arrow 45, in which position the pawl is ready to begin imparting a closing movement to the jaw 19.

To ensure accurate positioning of the detent, a pair of opposite slots 46,47 are provided in the outer end of the saddle 28, to engage guide pins 48,49 on boss 42 (see FIG. 2). The pins clear the end of the saddle when the cap 43 is in the upper position 43a shown in dot-and-dash lines in FIG. 4, so that the pawl can be readily turned. When the pawl is in the position shown in full lines in FIG. 4, the detent is riding on the upper surface of the ratchet segment. When it is in the lower position shown in dot-and-dash lines as 43b in FIG. 4, the detent is fully engaged in a tooth cavity in the ratchet 26. It is, of course, important to relate the depth of the slots 46 and 47 to the position of the guide pins, so that the pawl will not lift the pins entirely out of the slots in normal operation. Otherwise, the pawl might rotate slightly during a stroke of the operating handle. If it did so, the pins would keep the pawl from dropping all the way back into the slots, and would thus interfere with true registry of the detent with the ratchet tooth.

The saddle 28 has a lug or wing on each side. These lugs or wings extend towards the handle 15 and are spaced apart sufficiently to receive between them the end of the lever 24. They are identical in form. The lug 23 is seen in FIG. 1, while its counterpart lug 50 is seen from the opposite side in FIG. 5. The lever 24 is pivotally connected to the two lugs 23 and 50 by the pivot pin 51.

The operating handle 15 is mounted to a wing 52, formed on the fixed jaw member 18, by means of a floating pivot 53 which rides in a slot 54 formed in the body of the lever 24. The lost motion afforded by this floating pivot serves three purposes. First, it provides for multiple leverage because of the compound lever system. Second, it affords an idle motion while the jaws remain fixed at the degree of cutting thus far attained, even though the drive pawl is disengaged from the ratchet while it is being shifted to the next tooth. Third, it is so configured as to arrest movement of the handles towards each other during operation.

A conventional positive stop to limit closing movement of the handles is afforded by the abutment member 55, shown between the handles in FIGS. 1 and 2. But the inherent flexibility of the handles sometimes permits them to come suddenly too close together, at the end of a tough cut, so that the user's hands and knuckles are injured in spite of the positive stop. It has been found that what might be termed a preliminary stop, which becomes effective just before the positive abutment is reached, is quite desirable. This preliminary stop is provided by so configuring the slot 54 in which the floating pivot 53 rides as to end the movement of the pivot pin just a little before the handles reach the positive stop abutment 55. Should it happen that this preliminary stop is reached before the cable has been completely severed, the final severance can be effected by moving the hands so they will not strike each other, and then applying additional pressure to the handles, so the final stage of their stoke may even involve deliberate distortion of the handles. Enough play is provided in the compound lever pivots to accommodate this final closing.

One of the advantages of the present invention is the capacity to cut rods, cable, or tubing in places where there is not enough room to work the handles of conventional cutters. This is accomplished largely by interposing the ratchet and pawl arrangement with its compound lever drive system, so that the handles need not be widely separated in order to open the jaws. This advantage is also due to the imparting of a special configuration to the cutting edges of the jaws, as most clearly seen in FIG. 1. If the cutting edges extend in straight lines from the fulcrum area to the periphery of the jaws, the tool and the work piece tend to react against each other, squeezing the rod or cable radially out of the opening between the jaws and thrusting the tool away from the work. Hooked cutters with overlapping tips have been used to draw the work piece in towards the pivot, but the arc of curvature best suited to this type of cutting operation is so great that the handles must be spread very wide to fully open the jaws. In the preferred embodiment of this invention, I substitute for both of these conventional jaw forms a cutting edge configuration in which the initial cutting is done by straight-line edges which extend from the periphery of the jaws inwardly to a line which is tangential to the pivot and normal to a line bisecting the opening between the jaws. Thence the line of the cutting edge lies on the base or tangent line.

In other words, the opposed jaws are so configured that, when the jaw tips meet, their cutting edges define an opening which is wedge-shaped, resembling an elongated diamond, as seen in FIG. 1, which diminishes in size as the jaws are closed until it disappears as severance occurs. The configuration defined by the jaw edges when the jaws are fully open (see FIG. 2) is almost square, being somewhat wider at the periphery than at the base, but providing a base line which is nearly tangent to the pivot pin. This is best illustrated in FIG. 2, which shows the tool fully open but with the pawl set to begin closing movement. It is desirable to chamfer slightly the extreme tips of the jaws, so as to ensure that they will register properly when they meet.

Jaws of this shape do not force the work radially away from the fulcrum, but rather grip it from the sides between edges which tend, as they close, to draw the work in towards the pivot, yet they can be fully open even though the handles are not spread much more than by an arc of about 75°, as indicated by the arc line A, between the rest position of the operating handle 15 and one of its working positions, shown in dot-and-dash ouline as 15a, at the opposite end of its stroke.

The position shown in dot-and-dash outline in FIG. 2 indicates the relation of the parts when ready to begin the second stroke of the closing movement. The cutting edge 25a has been moved through the arc B while the axis of the pawl has moved through the arc C.

The drawing in FIG. 2 has been shaded at 56 to show the bevel which rises from the outer cutting edge 25 of the rotatable jaw 19. The corresponding bevel 57 rises from the inner cutting edge 58 of the same jaw. Corresponding bevels are provided on the opposite jaw, as seen in FIG. 1. Bevel 59 rises from the outer cutting edge 60 of the fixed jaw 29, and bevel 61 rises from the inner cutting edge 62 of that jaw. It will be noted that the cutting edges 60,62 of the fixed jaw 29 do not intersect at precisely a right angle, but preferably at an angle which is slightly obtuse, and that the same is true of the cutting edges 58 and 25 of the rotatable jaw 19. This makes it somewhat easier to engage a work piece which is close to the maximum capacity of the tool, since the cutting edges as their tips are somewhat farther apart at the periphery than they are near the pivot.

The jaw members are preferably forged. Milling the surfaces which slide over each other improves the operation of the tool. To reduce the area which must be milled, the stock may be forged to a lesser thickness in non-contacting areas. Thus the metal of the fixed jaw 18, which need not be milled, is forged to a lesser thickness at the handle end of this element than at the working face which is in contact with the opposite face of the ratchet segment and which requires milling. This difference in thickness in suggested by the dotted line 63 in FIG. 4.

FIG. 5 shows the relation of the parts at the beginning of the last stroke of the opening movement. The detent 44 is engaged in the last notch of the ratchet segment 21 and is about to rotate that segment until the jaw is in the position indicated by the broken lines 64. In the broken line showing of saddle 28a the position of the saddle 28 at the end of its stroke is shown, the lug 50 having moved to the position 50a, which is only fragmentarily indicated in order to avoid confusing the illustration.

It is important to adjust the tension on the pintle 34 to keep the sliding faces of the jaws closely together. This imposes a significant degree of friction, which aids in keeping the jaws in position between successive strokes of the operating handle, while the saddle is being moved into place for the next driving stroke. Because of the frictional resistance needed to preserve the position of the cutters between cutting strokes, it is necessary to reverse the pawl to begin opening movement of the jaws, and to move the jaws to fully open position by repeated strokes of the operating handle. The double leg saddle adds to the effectiveness of the pintle by greatly increasing the rigidity of the pivot mounting.

First attempts to devise the tool of the present invention resulted in a structure in which the saddle 28 was carried on a single leg 31. The present arrangement, in which the saddle has two legs, 30 and 31, significantly improves the effectiveness of the tool. For one thing, it increases the capacity of the tool to resist twisting along its lengthwise axis. Such twisting has a tendency to occur because the parallel faces of the bevels tend to spread the jaws apart laterally when there is a work piece between them. This tendency to spread is especially prevalent where the jaws have rectilineal obtuse-angled cutting edges, as in the preferred embodiment of this invention. It is also noticeable if the contours of the cutting edges are arcuate, but it has been found that with the saddle structure formed as herein shown and described, even the blades with arcuate cutting edges can be effectively used, and can be so used without having to carry the arc as far back from the tip as has been thought necessary in the past. it is still necessary, with tips having arcuate cutting edges, to provide some overlapping of the tips before cutting begins, but this need not be as great as where the present structure is used as it was in prior devices, since the new saddle structure ensures firm engagement of the jaw tips, and minimizes twisting.

I claim:

1. A two-handle-actuated cutting tool of the shear type having two oppositely-beveled cutting jaw members journaled on a common main pivot, and adapted to be opened and closed in shearing relationship, one of said jaw members being provided with a wheel segment having an arcuate ratchet portion circumferentially aligned with the axis of the main pivot; a bracket member comprising a saddle part and a pair of legs extending therefrom, said legs straddling both of said jaw members and being journaled on the main pivot and said saddle part housing a single, reversible driving pawl which operates said ratchet selectively to open or to close said jaws.

2. The device of claim 1 in which one of the handles has a flatted end portion pivotally connected to said bracket member and has a secondary pivot connecting it to the other of said handles.

3. The device of claim 2 in which a slot is provided in said flatted end portion, which said slot is so configured as to engage the secondary pivot and afford sliding motion thereto.

4. The device of claim 2 in which a slot is provided in said flatted end portion which engages said secondary pivot, which said slot is configured to check movement of the sliding pivot shortly before the handles connected thereto reach their normal limit of closing movement.

5. The device of claim 1 wherein the jaws are provided with opposed cutting edges, which, when the jaws are fully open, extend laterally and tangentially of the pivot pin in the inner part of said jaws, and then extend outwardly at slightly obtuse angles along straight lines to the tips of the jaws, whereby to provide an opening between the tips of the jaws which is slightly larger than the work piece to be sheared, while still providing an area into which the work piece is drawn by closing movement of the jaws.

6. The device of claim 1 wherein the driving pawl is shiftable between one position in which it operates to open the jaws and another position in which it operates to close them, said pawl and said saddle having interengaging guide means to position the pawl in accurate registry with said segment.

7. The device of claim 1, wherein the main pivot comprises a headed pintle which traverses both of said legs and carries a cap nut at one end which can be tightened to impose adjustable tension on said pivot to control frictional engagement between the jaw members, said cap nut being provided with locking means to retain the cap nut at the desired tension notwithstanding stresses encountered during use.

8. The device of claim 1 wherein the main pivot comprises a pair of bearing sleeves journaled in the ends of the legs, and a pivot pin provided with adjustable means for imposing tension on said pin, said sleeves being of greater length than the thickness of the legs in which they are mounted, and being configured to abut the outer faces of the jaws, whereby tension imposed upon the pivot pin tends to urge the jaws towards each other without imposing substantial stress upon the legs of the bracket.

9. The device of claim 8 wherein the adjustable means for imposing tension on the pivot pin includes a cap nut in threaded engagement with the pivot pin and lock means for securing the nut in position when the desired tension has been reached.

* * * * *